Apr. 10, 1923.
F. I. BARNIA
1,451,436
ARTIFICIAL MINNOW
Filed Mar. 6, 1922
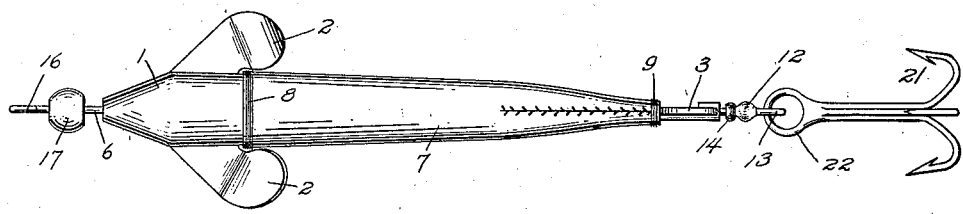
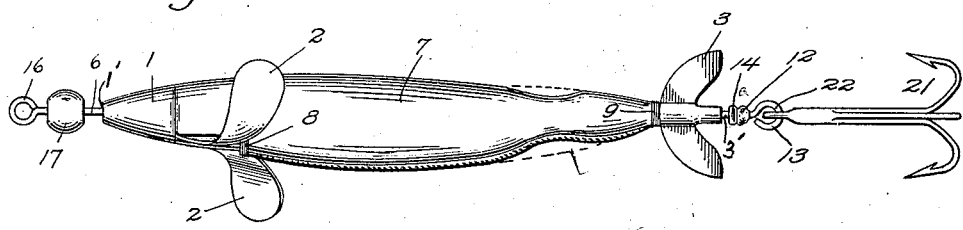
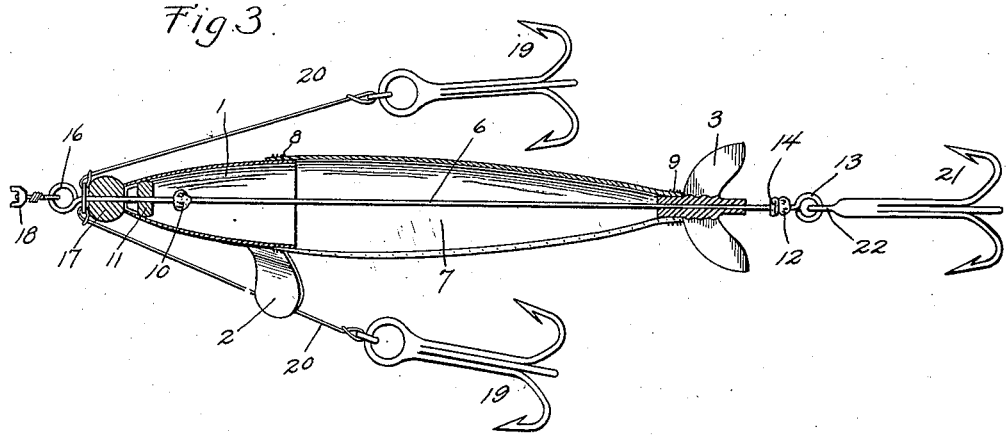
Inventor-
F. I. Barnia.
E. W. Anderson
Attorneys.

Patented Apr. 10, 1923.

1,451,436

UNITED STATES PATENT OFFICE.

FRANK I. BARNIA, OF MERRILL, WISCONSIN, ASSIGNOR OF ONE-HALF TO MATHILDE BARNIA, OF MERRILL, WISCONSIN.

ARTIFICIAL MINNOW.

Application filed March 6, 1922. Serial No. 541,577.

*To all whom it may concern:*

Be it known that I, FRANK I. BARNIA, a citizen of the United States, resident of Merrill, in the county of Lincoln and State of Wisconsin, have made a certain new and useful Invention in Artificial Minnows; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a bottom plan view of the invention.

Figure 2 is a side view of the same, showing the yieldable body pressed inwardly at a portion thereof.

Figure 3 is a central longitudinal section of the invention showing the head gangs of hooks.

The invention has relation to artificial bait and particularly to minnows, having for an object certain improvements to be stated.

The invention consists in the novel construction and combination of parts, as hereinafter set forth.

In the accompanying drawings illustrating the invention, the numeral 1 designates the head of the minnow, formed preferably of hollow sheet metal and provided with a perforation 1', and a pair of lateral wings or fins 2, curved oppositely in propeller fashion, and 3 is the tail also formed of sheet metal and formed with a perforation 3', a center rod or wire 6 to be described, being engaged with the perforations of the head and tail pieces.

The body 7 of the minnow is of some yielding or soft material, such as a fine leather which should be waterproofed, and which is suitably formed to simulate the body of the minnow, being also suitably colored or painted. This leather body is wired or secured to the hollow metal head 1 in rear of the gill fins as shown at 8, and is similarly wired or secured to the tail piece 3 forwardly thereof, as shown at 9.

The center wire 6 is provided with a lump of solder 10 thereon within the head of the fish and bearing against a bead or roller 11 loose upon the center wire, said solder holding said bead in rolling contact with the inner surface of the forward portion of the head of the fish, said wire being also formed with a lump of solder 12 thereon, just forward of the rear eye 13 of the wire, a bead or roller 14 being loose on said wire and located between said solder 12 and the rear longitudinal eye 15 of the tail piece, which latter is adapted to have rolling contact with said bead.

The center wire is provided with a forward eye 16, and located between this eye and the forward end of the fish head is a bead or roller 17, with which the fish head has rolling contact.

Engaged with the forward eye of the center wire is a swivel 18, with which suitable hooks may be engaged to project laterally and rearwardly, there being preferably three gangs of three hooks each as shown at 19, these constituting the head gangs of hooks, the hooks having the usual gut leaders 20 to the swivel.

The rear gang of hooks 21 is shown as having an eye 22 engaged with the rear eye of the center wire.

It is found in practice that with a soft bodied artificial minnow, the fish in biting will press the sides of the soft minnow body together and thereby become hooked better or deeper.

Any movement of the head of the fish towards the tail piece thereof is resisted by the bearing of the roller 11 against the inner surface of the head, whereby the body of the minnow is prevented from being broken or crumbled by the fish biting at the bait and pulling the head of the minnow rearwardly as is common.

The body of the minnow may be made of porpoise leather, which is waterproof, or it may be made of waterproof silk, or other suitable material.

In the movement of the minnow through the water, the gill fins will cause it to revolve as a whole by a very slight pull or movement.

The invention is readily made at a slight cost and has been thoroughly demonstrated in practice.

The body 7 and the center wire 6 are bendable and the latter may be resilient, so that the body may bend from side to side under inequalities of pressure as it is drawn through the water thereby giving a more life like effect, the wire 6 causing the body to be brought back to normal position through its resiliency and also acting as a stiffener for said body.

I claim:—

1. An artificial minnow, having a head piece and a tail piece of unyielding material, the head piece being hollow and provided with a perforation and with gill fins oppositely curved in propeller fashion and the tail piece having a perforation, a center wire engaging the perforations of the head and tail pieces, and a body of yieldable material connecting the head piece and the tail piece and surrounding said wire.

2. An artificial minnow, having a head piece and a tail piece of unyielding material, the head piece being hollow and provided with a perforation and with gill fins oppositely curved in propeller fashion, and the tail piece having a perforation, a center wire engaging the perforations of the head and tail pieces, a body of yieldable material connecting the head piece and the tail piece, a bead roller upon said wire and bearing against the inner side of the head piece, and a particle of solder upon said wire acting to hold said bead roller in rolling contact with said head piece.

In testimony whereof I affix my signature, in presence of two witnesses.

F. I. BARNIA.

Witnesses:
MIKE SHAPE,
PERCY COTEY.